Dec. 13, 1932.  C. DREXLER ET AL  1,890,973
ANTIREVERSE BRAKE MECHANISM
Filed Oct. 29, 1929
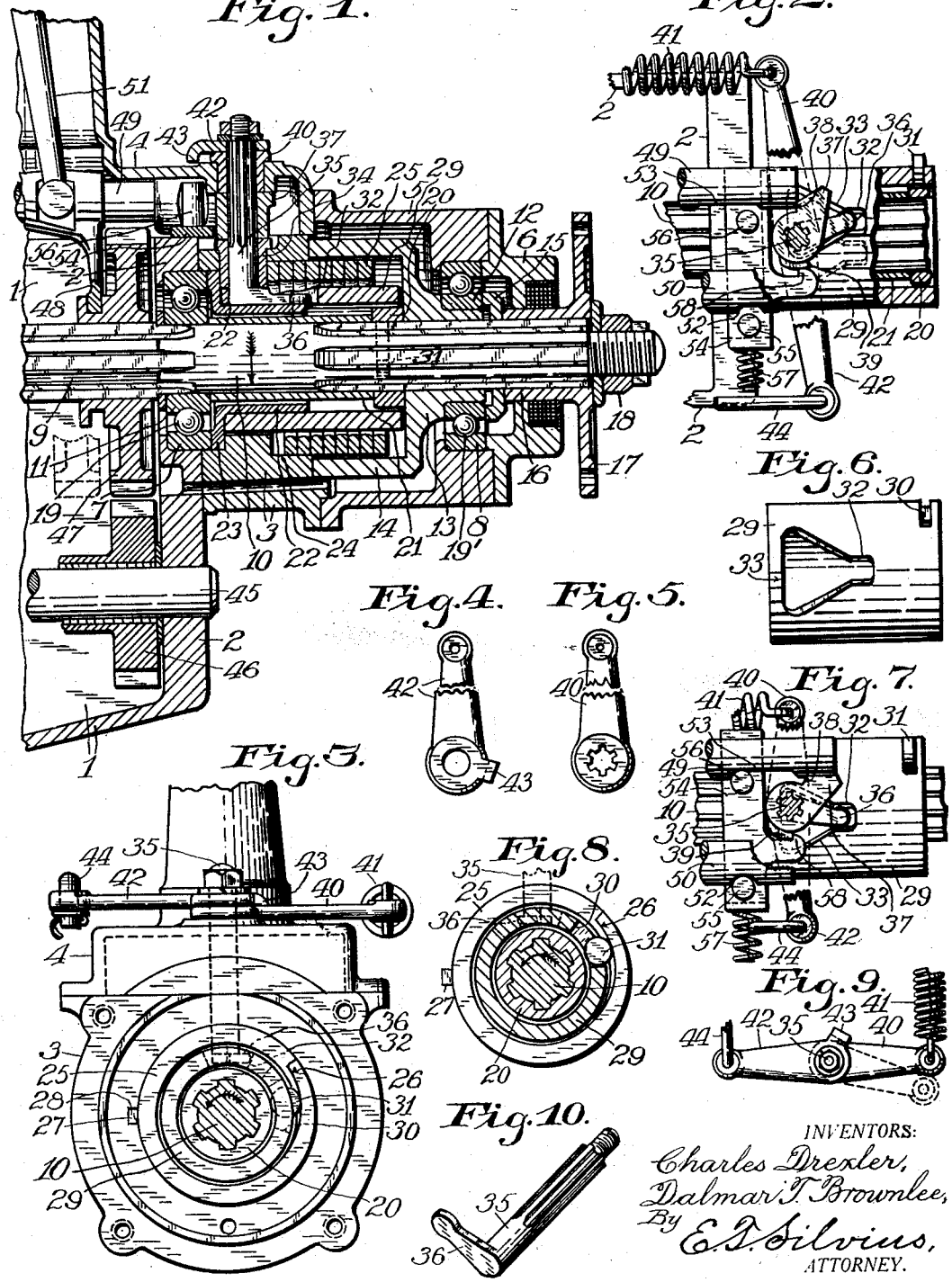
INVENTORS:
Charles Drexler,
Dalmar T. Brownlee,
By E. T. Silvius,
ATTORNEY.

Patented Dec. 13, 1932

1,890,973

UNITED STATES PATENT OFFICE

CHARLES DREXLER AND DALMAR T. BROWNLEE, OF INDIANAPOLIS, INDIANA, ASSIGNORS TO L. G. S. DEVICES CORPORATION, OF INDIANAPOLIS, INDIANA, A CORPORATION OF INDIANA

ANTIREVERSE BRAKE MECHANISM

Application filed October 29, 1929. Serial No. 403,314.

This invention relates principally to antireverse brake mechanism for motor-vehicles of the type that is designed automatically to act and stop dangerous backward movement when stopped in ascending a hill, the invention having reference more particularly to means for controlling said mechanism.

An object of the invention is to provide a simple and improved safety anti-reverse brake mechanism of such construction as to have few parts adapted to be expeditiously and inexpensively manufactured and yet be adapted to reliably operate automatically and prevent backward movement of a motor-vehicle.

Another object is to provide an improved anti-reverse brake controlling mechanism that shall be adapted to operate quietly and not require much effort in the control thereof, and not be liable to be or become a source of trouble when subjected to severe operating conditions.

A further object is to provide an improved anti-reverse brake mechanism for motor-vehicles that shall be adapted to be simply constructed and controlled by means of a gear shifter rod in synchronism with control of speed changing or reverse gears.

A further object is to provide an improved mechanism of this kind of such construction and arrangement of parts as to be readily accessible for inspection or repairs, and of such character as to be adaptable for reliable automatic control in harmony with the operation and control of various features of a transmission gear set.

A further object is to provide an improved anti-reverse brake mechanism of such construction as to be adapted automatically to release with all backward movement of the reverse sliding gear when moving into reverse position, and shall remain released until the sliding gear is moved forward and out of engagement with the reverse idler of the transmission gear set.

A still further object is to provide a mechanism of this kind of such construction as to cause but slight friction in operation and wear during long usage, which shall not be liable to become over-heated at high forward speed, which shall be adaptable to be used in connection with speed changing transmission apparatus of motor-vehicles as commonly constructed, and which shall be adapted to be durable and economical in use.

With the above-mentioned and other objects in view, the invention consists in an improved mechanism and controlling apparatus therefor, and in novel housing structure to support the controlling apparatus; the invention consisting also further in the parts and combinations and arrangements of parts, as hereinafter particularly described and further defined in the claims appended hereto.

Referring to the accompanying drawing,—Figure 1 is a vertical longitudinal central section of the improved anti-reverse brake mechanism in connection with a conventional motor-vehicle transmission set of which a portion sufficient to an understanding of the invention is illustrated; Fig. 2 is a fragmentary top plan of associated parts of clutch controlling apparatus embodied in the invention; Fig. 3 is a transverse section and elevation of various parts of the invention; Fig. 4 is a plan view of an operating lever partially broken away; Fig. 5 is a plan view of a control lever partially broken away; Fig. 6 is a top plan of a novel roller retainer embodied in the invention; Fig. 7 is a top plan showing controlling structure in operative association with a shifter rod, various parts being in different positions relatively to similar parts appearing in Fig. 2; Fig. 8 is a transverse section of an assembly of parts whereby operations of a spring clutch are controlled; Fig. 9 is a top plan of the operating and controlling levers connected together; and Fig. 10 is a perspective view of a controlling crank embodied in the invention.

Similar reference characters in the different figures of the drawing indicate corresponding elements or features of construction herein referred to in detail.

Only so much of a conventional motor-vehicle transmission gear set is illustrated as is sufficient to an understanding of the relation of the invention thereto. The housing of the gear set comprises a body portion 1 and a rear end portion 2 having an aperture in which to support a transmission shaft, the end portion having a housing extension 3 thereon which preferably is separately made and secured in place, a suitable covering top part 4 being secured thereto. A housing front part 5 is secured to the extension part 3 and the top part 4 and has a cap member 6 suitably secured thereto. A bearing ring 7 is secured in the end portion 2 and a bearing ring 8 is arranged in the part 5. A transmission shaft comprises a main portion 9 and a relatively smaller extension portion 10 extending through the housing, the smaller portion having a gearing ring 11 thereon within the ring 7; the extension portion of the shaft having a bearing ring 12 thereon, preferably in direct contact with a hub 13 that is splined to the shaft and has an annular clutch member 14 integral therewith or fixed thereto, being bored to afford a friction clutch face. A washer 15 is placed on the shaft against the ring 12 and held in place by the hub 16 of a coupling flange 17 splined to the shaft and secured in place by a nut 18, the flange being adapted for connection with a propeller shaft. Bearing balls 19 are arranged between the rings 17 and 11 and bearing balls 19' are arranged between the rings 8 and 12. The shaft has a cylindrical roller track 20 thereon, preferably made separately and keyed to the shaft so as to be located within the clutch member 14 adjacent to its hub, and preferably a tubular spacer 21 is arranged on the shaft between the track and the ring 11.

For supporting controlling apparatus on the housing, a hollow cylindrical guide 22 is arranged so as to freely receive the shaft and spacer thereon and it has a flange 23 on one end that is suitably secured in a recess provided in the base portion of the part 3 adjacent to the bearing ring 7. The part 3 has a counterbore 24 therein tightly receiving one end portion of a coiled clutch spring 25, the remainder of the spring being arranged in the clutch member 14 and expansible into contact therewith, the terminal spring coil having an inclined inner contact face 26. The clutch spring is more securely anchored by provision of a lug 27 on its back end that extends into a recess or pocket 28 provided therefor in the wall of the part 3.

An important element of the clutch controlling apparatus comprises a hollow cylindrical roller retainer 29 that is arranged on the guide 22 so as to be oscillated thereon, being inside of the spring clutch and having a guide slot 30 in the wall thereof adjacent to the track 20, a roller 31 being arranged in the slot so as to cause wedging connection with the inclined face 26 while rolling on the track upon reverse movement of the shaft. The wall of the retainer has an opening or notch 32 therein to receive the end portion of the crank arm 36 and preferably has a clearance opening 33 in which the crank arm 36 may freely move.

Novel clutch control apparatus is provided and includes a crank for shifting the retainer 29, and preferably comprises a guide bushing 34 set into the upper portion of the housing portion 3, and a shaft 35 rotatively guided in the bushing and having a crank arm 36 thereon which conveniently has a guide bearing on the upper portion of the guide 22, the lower end of the shaft being in the clearance opening 33 so that the arm projects from the shaft into the opening 32 or notch in which the arm operates directly against opposite wall portions of the retainer without the need of a crank pin. A latch arm 37 is keyed to the shaft 35 and has a catch shoulder 38 on one side thereof and also a ratchet tooth 39 on its opposite side. A controlling arm 40 is keyed also to the shaft and its hub portion is rotatively guided in the top portion of the cover 4, a retracting spring 41 being connected to the arm and also with the housing by any appropriate means. An operating lever arm 42 has a hub portion that is rotative upon the shaft at the top of the arm 40 and has a lug 43 thereon engaging the arm 40 to swing the latter so as to shift the latch arm 37 or to cause return movement of the arm 42, the latter being operated by means of a connecting rod 44 which may be extended to any desired point convenient to the operator of the motor-vehicle for operation at will or as may be desired.

A conventional transmission gear set includes a countershaft 45 on which is a reverse gear 46 to be connected through an idler gear (not shown) with a sliding gear 47 on the drive shaft under control of a shifter fork 48 and shifter rods 49 and 50 and a shifter lever 51. The shifter rod 50 is operated in controlling forward speed gears, and the rod 49 is moved in operating the gear 47 for reverse motion and low speed forward motion. The rod 50 has a notch 52 in its side and the rod 49 has an elongated notch or recess 53 in its side. A latch bar 54 is suitably arranged under the shifter rods and guided by the housing and has a pin 55 thereon to be carried into the notch 52 and also a pin 56 to be carried into the recess 53, when the bar is shifted in one direction which is done by means of a compression spring 57 suitably supported. The latch bar has a lateral latch finger thereon having a pawl member 58 to co-act with the tooth 39.

In practical use a motor-vehicle equipped with the anti-reverse mechanism is driven forward when the transmission shaft is rotated in the direction indicated by the arrows thereon, the gear 47 then being off from reverse position, the roller 31 being held by its retainer approximately as shown in Figs. 2 and 8 so as to be free between the thinner end of the spring coil and the surface of the track 20, permitting automatic release of the clutch spring. When ascending a hill, if the motor-vehicle stops and starts backward the roller 31 rolls back against the thicker portion of the spring and immediately and automatically stops the backward movement by causing expansion of the spring clutch into contact with the clutch member 14. Unclutching automatically occurs upon forward movement of the motor-vehicle and continues so that the shaft turns freely during all forward speeds. In order to prevent action of the clutch so as to permit the motor-vehicle to be purposely pushed or pulled backward when parking or in a garage or elsewhere, the arm 42 is operated by means of the rod 44 which might be connected with a handle upon the instrument board of the motor-vehicle, the movement of the arm causing operative movement of the controller arm 40 which in turn rotates the shaft 35 so that the crank arm 36 turns the retainer 29 sufficiently to shift the roller 31 so as to cause release of the clutch. The shifter rods and the gear 47 being in neutral position the pins on the latch bar 54 are positioned in the notches that are in the sides of the shifter rods, so that the shaft 35 is latched against return, permitting the motor-vehicle to be intentionally moved, unlatching of the shaft 35 occurring when either one of the shifter rods is moved for changing gears so as to force the bar 54 back against the pressure of the spring 57. It is to be understood that unlatching of the shaft occurs by means of the shifter rod 49, engaging the shoulder 38 upon movement of the rod back to reverse position so that the motor-vehicle may be driven backward when desired. Because of the relatively long notch 53 the clutch spring will not come into action when the reverse gear is shifted from reverse to neutral position, but only when shifted further into a forward speed position. The spring 41 acts to turn the shaft 35 so as to cause the relative arrangement of members thereon as shown in Fig. 2 following the forcing of the pin 55 from the notch 52 by movement of the shifter rod 50 so that the pawl device 58 is released from the tooth 39 to effect forward driving and to assure unfailing action of the safety anti-reverse brake in case of danger due to backward movement of the motor-vehicle.

What is claimed is:

1. Anti-reverse brake mechanism having an operable clutch device for stopping a rotary shaft, a roller to co-operate with the device for controlling its operation, a shiftable retainer to control the roller and having an opening therein, a rock shaft and a crank on said shaft disposed in said opening and operable to control the retainer.

2. Anti-reverse brake mechanism having an operable clutch device, a rotary shaft provided with a clutch member to be engaged by the clutch device to stop reverse movement of the shaft, and control means including a rotatively shiftable hollow cylinder provided with an opening therein a controllable crank arranged in said opening to control movement of the cylinder.

3. Anti-reverse brake mechanism having an operable clutch device, a rotary shaft to be stopped by the device, a controlling apparatus for the device comprising a hollow shiftable cylinder and a roller loosely retained thereby to co-act with the clutch device said cylinder also being formed to provide opposed shoulders, a track on the shaft to guide the roller, and a crank arranged to engage either of said shoulders to control the shifting of the cylinder.

4. Anti-reverse brake mechanism having a rotary drive shaft provided with a guide track, a hollow cylindrical retainer shiftable about the track and having a circumferential guide slot, an operable clutch device having a tapered contact portion, a roller in said slot to operate on said track and said contact portion, and a controlled crank adapted to engage opposed shoulders provided on said retainer for controlling the movement of said retainer.

5. Anti-reverse brake mechanism having friction clutch means, a transmission shaft rotatable free of the clutch means in one direction, clutch-controlling apparatus co-acting with the shaft for actuating the clutch means to stop reverse rotation of the shaft, said apparatus including a sleeve rotatable with respect to the transmission shaft and a roller actuated thereby for direct action on said clutch means and a rockable shaft disposed radially of the transmission shaft and including a part formed for engagement with said sleeve to so move the same as to render the roller inoperative in its action upon said clutch means.

6. Anti-reverse brake mechanism having a controlling apparatus including an annular guide to be fixedly supported, a hollow cylindrical retainer adapted to guide a roller, the retainer being rotatively arranged on the annular guide, a shaft having a crank arm to control the retainer, a control lever keyed to the shaft, an operating lever loose on the shaft and having a finger to engage and move the control lever in one direction, an arm fixed to the shaft and having a ratchet tooth and also a contact shoulder, and a latch bar having a pawl device to engage said tooth.

7. Anti-reverse brake mechanism having an operable clutch device provided with a tapered contact portion, a transmission shaft rotatable free of the clutch device in one direction and having a continuous circumferential guide track thereon, a clutch member fixed to the shaft to be engaged by the clutch device, clutch-controlling apparatus including a roller guided on the track to operate on said tapered portion for operating the clutch device, a retainer for the roller, a crank shaft and crank for controlling the retainer, and a latch for the crank.

8. Safety anti-reverse brake mechanism including a rotary transmission shaft normally to rotate in forward direction and provided with a continuous circumferential guide track, a housing for the shaft provided with a fixed annular guide extending about the shaft, a coil spring clutch device connected at one end to the housing and having a tapered opposite end portion, an annular clutch member extending about the clutch device and having connection with the shaft to rotate therewith, and clutch-controlling means mounted on the housing and the annular guide to co-operate with the guide track and said tapered clutch device portion to automatically stop reverse rotation of the shaft, the clutch-controlling means having operative apparatus controllable to permit the reverse rotation.

9. Safety anti-reverse brake mechanism comprising a housing, a transmission shaft rotatably supported in the housing, a guide track secured on the shaft, an annular guide secured to the housing and extending about the shaft, a coil spring clutch device secured at one end to the housing and having a tapered opposite end portion opposite to the guide track, an annular clutch member extending about the clutch device and having a fixed connection with the shaft, a retainer rotatively supported on the outside of the annular guide, a roller guided by the retainer to operate between the guide track and the tapered clutch device portion, a crank shaft rotatively supported by the housing and having an arm thereon connected with the retainer to control action of the roller, a control lever keyed to the crank shaft, a retracting spring connected to the lever, an operating lever loose on the crank shaft and having a finger to engage and operate the control lever, an operating rod connected to the operating lever, a latch arm secured to the crank shaft and having a ratchet tooth thereon, the latch arm having a shoulder to be engaged by a shifter rod for actuating the crank shaft, a latch bar shiftably supported by the housing and having a lateral pawl member to engage said tooth, the latch bar having pins thereon to enter notches in shifter rods, and a compression spring operating on the latch bar to actuate the pawl member.

10. In an anti-reverse brake mechanism, the combination of a transmission shaft normally to rotate in forward direction, a controllable clutch operable to stop motion of the shaft when started to rotate in the reverse direction, controlling means constantly controlled by the shaft and automatically operating the clutch upon reverse rotation of the shaft, said means including a sleeve surrounding said shaft and a roller actuated thereby for direct action on said clutch, and a crank intervening in the controlling means to prevent the operation of the clutch and extending radially of said shaft and directly engaged with said sleeve for actuating the same, said crank being provided with means for manual control and also means for automatic control thereof.

11. In an anti-reverse brake mechanism, the combination of a transmission shaft normally to rotate in the forward direction provided with a guide track, an operable friction clutch to stop movement of the shaft when started to rotate in the reverse direction, a rotatively shiftable retainer, a roller operating on said track to operate and control the friction clutch and under control of the retainer, a crank having controlling connection with the retainer and provided with manual control devices and automatic control devices operable to actuate the crank and secure it in the desired position.

12. In an anti-reverse brake mechanism, the combination of a fixed annular guide, a controlling retainer rotatively shiftable on the guide, a crank shaft having an arm connected with the retainer, a controlling lever secured to the crank shaft and provided with a retracting-spring, an operating-lever loosely connected with the crank shaft and provided with a device to connect with and move the controlling lever in one direction, a pull device connected to the operating-lever, a latch arm secured to the crank shaft and having a catch shoulder to be engaged by a shifter rod for automatic control, the latch arm having also a ratchet tooth, and a spring-impelled latch apparatus engageable with said tooth and adapted to be automatically controlled by the shifter rod, with an operable clutch mechanism controllably connected with said retainer.

13. In an anti-reverse brake mechanism, the combination, with a housing and a transmission shaft rotatably supported thereby, of a track on the shaft, an annular guide fixed to the housing, a roller to run on the track, a cylindrical retainer rotatively shiftable on the annular guide and having a slot receiving the roller and enabling the retainer to control the movements of the roller, a crank shaft having an arm connected with the retainer, a lever for controlling the crank shaft, and a clutch device having a wedge-inclination to be acted upon by the roller.

14. In an anti-reverse brake mechanism, the combination, with a housing and a transmission shaft rotatably supported thereby, of a coil spring clutch device secured at one end to the housing, a clutch member having a fixed connection with the shaft, a retainer guided on the housing to be shifted circumferentially about the shaft, a controlling crank operatively connected with the retainer, mechanism operable for controlling the crank automatically and alternatively by manual selection, and a connecting device controlled by the retainer to be actuated by the shaft and coacting with the opposite end portion of the clutch device to stop reverse rotation of the shaft.

15. In an anti-reverse brake mechanism, the combination, with a housing and a transmission shaft rotatable therein, of a crank shaft supported by the housing, a cylindrical retainer rotatively guided by the housing, clutch means controlled by the retainer and the shaft to stop reverse rotation of the shaft and alternatively permit the reverse rotation, a latch arm secured to the crank shaft and having a catch shoulder and a ratchet tooth, a spring-retracted control lever secured to the crank shaft, a spring-impelled latch bar supported by the housing and provided with a guide pin and also a pawl member to engage said tooth, and a shifter rod supported by the housing and having a long recess in its side to receive said pin, the rod being arranged to engage said contact shoulder to move the latch arm.

In testimony whereof, we affix our signatures on the 24th day of October, 1929.

CHARLES DREXLER.
DALMAR T. BROWNLEE.